(12) United States Patent
Heidjann

(10) Patent No.: US 6,231,439 B1
(45) Date of Patent: May 15, 2001

(54) EASY ASSEMBLY SEPARATOR FOR COMBINE HARVESTERS

(75) Inventor: Franz Heidjann, Harsewinkel (DE)

(73) Assignee: Claas Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 09/235,442

(22) Filed: Jan. 22, 1999

(30) Foreign Application Priority Data

Jan. 24, 1998 (DE) .............................................. 198 02 672

(51) Int. Cl.⁷ ...................................................... A01F 12/40
(52) U.S. Cl. ................................ 460/80; 460/78; 460/110
(58) Field of Search ................................ 460/66, 69, 70, 460/72, 73, 80, 78, 110, 112

(56) References Cited

U.S. PATENT DOCUMENTS

| | | | |
|---|---|---|---|
| 2,020,380 | * | 11/1935 | Schlayer .................................. 460/71 |
| 2,148,547 | * | 2/1939 | Fiese et al. ............................. 460/36 |
| 5,480,351 | * | 1/1996 | Coleman ................................. 460/72 |
| 5,769,711 | | 6/1998 | Roberg . |
| 5,913,724 | | 6/1999 | Roberg . |
| 5,928,079 | | 7/1999 | Roberg . |
| 6,027,407 | | 2/2000 | Roberg . |

FOREIGN PATENT DOCUMENTS

| | | |
|---|---|---|
| 363650 | 11/1922 | (DE) . |
| 390 709 | 6/1990 | (DE) . |
| 196 00 390 A1 | 12/1996 | (DE) . |
| 297 13 324 U1 | 1/1998 | (DE) . |
| 197 20 074 A1 | 11/1998 | (DE) . |
| 0 748 583 A1 | 5/1996 | (EP) . |

* cited by examiner

Primary Examiner—Thomas B. Will
Assistant Examiner—Meredith C. Petravick
(74) Attorney, Agent, or Firm—Husch & Eppenberger, LLC; Robert E. Muir; Kevin M. Kercher

(57) ABSTRACT

A self-propelled combine harvester has an axial-flow separating device including a chopping device with supporting rings which carry impact teeth. The main body of each separating rotor is equipped with several positioning profiles, which are rigidly connected to the main body and extend spirally around it. The supporting rings are provided with corresponding grooves. As a result, a form-locking connection is made between the supporting rings and the main body. The positioning profiles are toothed at the longitudinal edge leading in the direction of rotation of the separating rotor, so that the regions of the supporting rings adjoining the recesses engage in the tooth gaps are prevented from sliding axially. A locking ring is releasably mounted on the rear end of the main body. The number of parts is minimized and the construction of the supporting rings carrying the impact teeth and the main body of the separating rotor minimize the assembly time.

13 Claims, 5 Drawing Sheets

EASY ASSEMBLY SEPARATOR FOR COMBINE HARVESTERS

BACKGROUND OF THE INVENTION

The present invention relates generally to agricultural machinery and, more particularly to improvements in separators for combine harvesters for agricultural crops.

The invention concerns a combine harvester with a cutting bar and a sloping conveyor, which transports the cut material away. A tangential or axial thresher is mounted behind the sloping conveyer, which is followed in the direction of flow of material by at least one separating device. The separating device works by the axial-flow method and comprises at least one drivable separating rotor which is rotationally surrounded by a housing. Over a certain conveying distance, the drivable separating rotor is constructed as a chopping device for the straw and cooperates with chopping blades. The cylindrical main body of the separating rotor carries several rows of impact teeth which extend in the longitudinal direction, preferably helically or arcuately, and which are arranged on supporting rings spaced apart from one another.

The combine harvester in question is particularly suitable for harvesting cereal grain. After threshing out the grain with the thresher it is necessary to separate out the grain from the grain and straw mixture. The separating device here, which works by the axial-flow method, ensures continuous transport of the straw around the separating rotor. This is achieved by the helically or spirally extending conveying elements, such as conveying strips for example, in cooperation with guide webs in the rotor housing. The guide webs can run parallel to and at a distance from the axis of rotation of the separating rotor or likewise be arranged helically or spirally. Usually the separating rotor is equipped with four conveying elements which are each respectively offset from one another by an angle of 90 degrees and arranged in rows. The outer edges of the conveying elements, which are constructed as conveying strips and whose edges face away from the axis of rotation are sawtooth-shaped. Most combine harvesters are equipped with a chopping device for the straw which can be used selectively, depending on whether the straw is to be deposited in swathes or is to be distributed as chopped material over the harvested field surface. The separating rotor of the separating device, which works by the axial-flow method, can work opposite the direction of forward travel of the combine harvester or transversely thereto. In the former case, the axis of rotation of the separating rotor is transverse and in the latter case the axis of rotation is parallel and at a distance from the wheel axles of the combine harvester.

A combine harvester in European patent publication 0 748 583 A1, shows a main body of the separating rotor in the region of the chopping device which has a smooth surface. In order to chop the straw, it is equipped with a plurality of supporting rings which are spaced apart from each other. These supporting rings carry the impact teeth on the circumferential side. It can be seen from this patent that the supporting rings are fixed to the main body of the separating rotor by a welded connection or screw connection. Such connecting techniques known in the art however cause the assembly time to be extremely long. As the impact teeth are regarded as wearing parts, after an operating time which cannot be determined exactly, it becomes necessary to exchange the supporting rings with the impact teeth. The time for dismantling and for subsequent assembly is extremely long. Moreover, the possibility of the impact teeth being damaged, for example by foreign bodies, exists. Thus, either all the supporting rings or only some may have to be exchanged. Thus, the prior-art construction is not particularly maintenance and assembly-friendly and, due to the long assembly times, can be relatively cost-intensive.

German patent publication 197 20 074 A1 proposes that the impact teeth of one row form a single-piece impact tooth functional part which is releasably attached to the main body of the separating rotor. Filler bodies, which are provided with cutting grooves for the chopping blades, are arranged between the rows of impact teeth. The filler bodies located between two rows of impact teeth are constructed in one part and also releasably attached to the main body of the separating rotor or to an adjoining impact tooth functional part. German patent 197 20 074 A1 also presents a solution in which each impact tooth functional part and the filler body behind it in the direction of rotation are also in one part. However, this solution also requires significant assembly time, so that this proposed solution also cannot be structurally converted.

It is an object of the present invention to overcome one or more of the above-described difficulties.

Another object is to provide a combine harvester having a separator which is structurally simple, thus significantly simplifying the assembly of the supporting rings of the chopping device.

SUMMARY OF THE INVENTION

In accordance with the present invention there is provided a combine harvester having a cutting mechanism; an elevating conveyor for transporting the cut material; a threshing mechanism mounted behind the elevating conveyor; an axial-flow separating mechanism for separating grain from straw; and the separating mechanism being mounted behind the threshing mechanism and comprising at least one drivable separating rotor surrounded by a housing, a chopping device for the straw over a certain conveying distance and cooperating with chopping blades, and the separating rotor including a cylindrical main body carrying one or more rows of impact teeth extending in the longitudinal direction and which are arranged on spaced supporting rings; the main body of each separating rotor having a plurality of positioning profiles fixed thereto; the supporting rings corresponding to the rotor circumference being provided with at least a number of recesses corresponding to the number of positioning profiles; and means for securing the supporting rings and the positioning profiles in form-locking relationship to prevent turning and axial sliding.

The object of the present invention is achieved by equipping the main body of each separating rotor with at least one positioning profile fixed thereto, providing the holes of the supporting rings corresponding to the rotor circumference with a number of recesses which correspond to the number of positioning profiles, and fixing the supporting rings to the positioning profiles in form-locking relationship, thus preventing the supporting rings from turning and sliding axially.

According to one embodiment of the invention, it is not absolutely necessary to fix the supporting rings by mechanical connecting elements, such as bolts or by welding seams to the main body. The positioning profiles provide a push-fit system since, starting from the front side, the supporting rings with the impact teeth arranged thereon can be fitted on the main body successively. If occasion arises additional elements can be assembled, depending on the type of form-locking connection. The positioning profiles are to be regarded as a template by which the position of the impact teeth and supporting rings is predetermined. A releasable connection is provided between the main body and the supporting rings. The grooves of the supporting rings are sufficiently wide such that, even with a helical or curved path of the positioning profiles, the supporting rings can be properly fitted to the main body. Various elements can be used for the form-locking connection of the supporting rings to the main body. The design according to the invention only requires fitting a locking ring onto the rear end of the separating rotor in the direction of transport and in the region of the chopping device.

In a further embodiment of the present invention, it is provided that the positioning profiles at a longitudinal edge comprise teeth, that the regions of the supporting rings adjoining the recesses lie in the tooth gaps of the teeth and that a spacer or distance ring is provided between two supporting rings, which on one side face comprises clamping elements which engage in form-locking relationship in the free partial recesses of the supporting rings resulting from the tooth gaps of the positioning profiles, thereby closing them.

The form-locking connection is simplified by the teeth between the positioning profiles and the supporting rings. Axial locking is made possible by the regions of the supporting rings adjoining the recesses engage in the tooth gaps. The clamping elements engaging in the recesses results in locking against rotation. As these clamping elements are in one piece with the distance rings, at the same time the distance between the supporting rings is predetermined. The positioning profiles and the distance rings can be constructed easily with the applicable manufacturing techniques even if the positioning profiles extend arcuately or helically. With this construction it is also unnecessary to use tools when changing the supporting rings after removal of the end locking ring. It is also advantageous when the clamping elements are wedge-shaped and formed integrally on the front side face of each distance ring. The wedge-shaped design provides an insertion aid for fitting in the recesses. Moreover means to prevent rotation without play is provided. In the simplest design the teeth consist of alternately arranged rectangular teeth and corresponding tooth gaps. Due to the rectangular construction of the tooth gaps, there is a large area of contact of the regions of the supporting rings adjoining the recesses with the surfaces defining the tooth gaps. In order for the supporting rings to be pressed into the tooth gaps by the forces arising in the operative state, it is provided that the teeth, seen in the direction of rotation of the separating rotor, are provided at the leading longitudinal edge of each positioning profile. The forces are then transmitted via the positioning profiles to the main body. Here an advantageous distribution of these forces is achieved if the main body is provided with four equiangularly spaced-apart positioning profiles and the supporting rings are provided with corresponding recesses.

According to yet another embodiment of the present invention, it is provided that the positioning profiles in cross-section are flat profile sections and that the supporting rings in cross-section are angle-shaped. Furthermore, the impact teeth are attached to the circumferential surface of larger diameter and the widths of the recesses of the supporting rings essentially correspond to the width of the positioning profiles. The attachment which is kept smaller in diameter then has the function of a distance ring. This construction advantageously reduces the number of components compared with the previous design. The widths of the recesses must be selected in such a way that, in the radial direction there is a secure connection of the supporting rings to the main body. The smaller attachment which determines the distance between the impact teeth can be arranged on both the front and the rear sides of the supporting ring. With this construction too, locking in the axial direction is achieved by a locking ring mounted releasably on the end of the main body. However, in order for there to be locking in this direction without play, it is provided that several pressure screws, working in the axial direction, are screwed into the locking ring. The locking ring is equipped with at least one impeller paddle on its outer surface for the purpose of promoting the discharge of material at the rotor end.

BRIEF DESCRIPTION OF THE DRAWINGS:

Reference is now made to the drawings which illustrate the best known mode of carrying out the invention and wherein the same reference numerals indicate the same or similar parts throughout the several views. With the aid of the attached drawings the invention will be described in more detail.

FIG. 7 is a large scale detail showning the relationship of the parts in the lower right hand corner of FIG. 3 and usable with the FIG. 5 embodiment.

DETAILED DESCRIPTION

Figure 1:
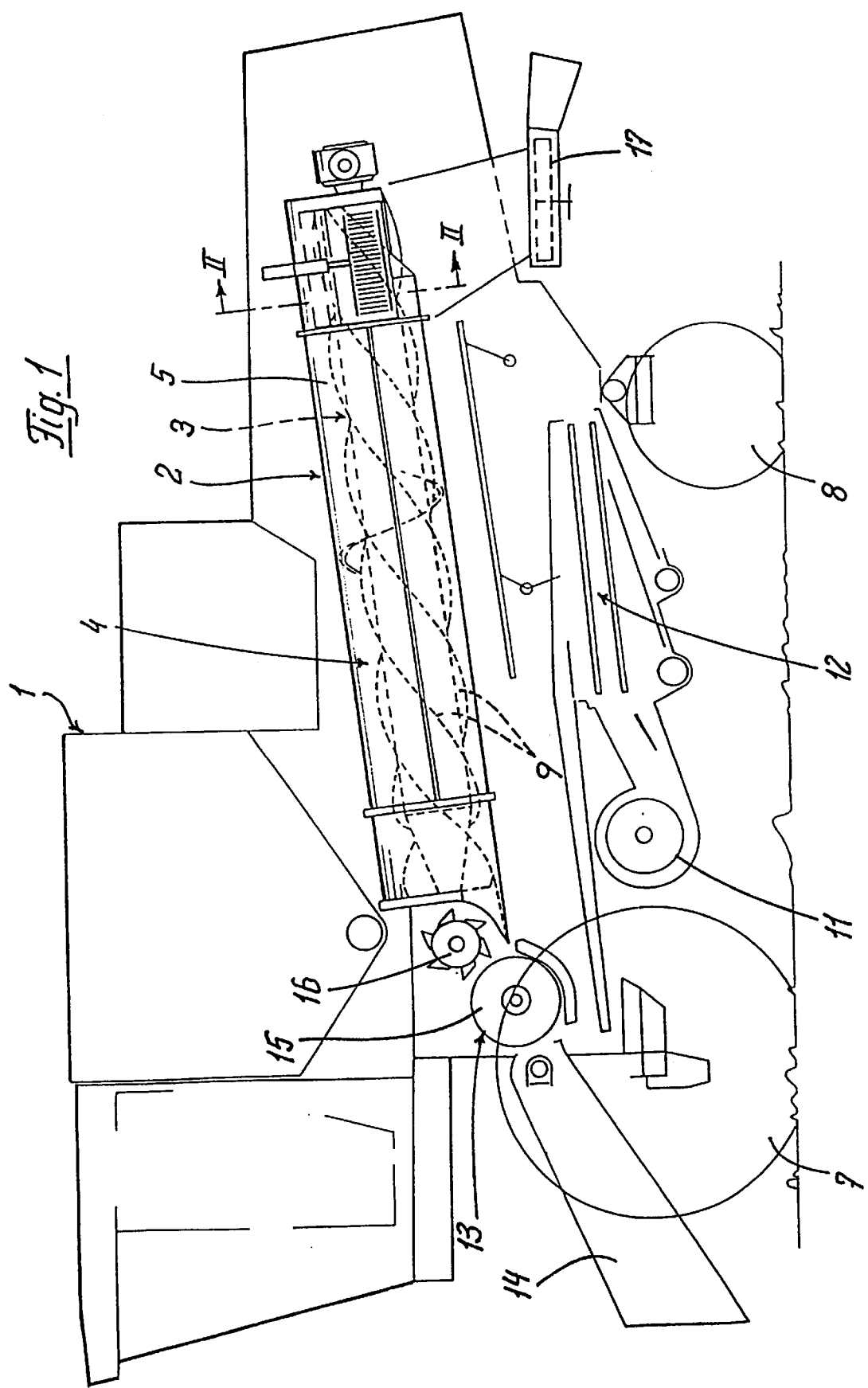
FIG. 1 is a schematic side view of a combine harvester embodying the invention.
Figure 4:
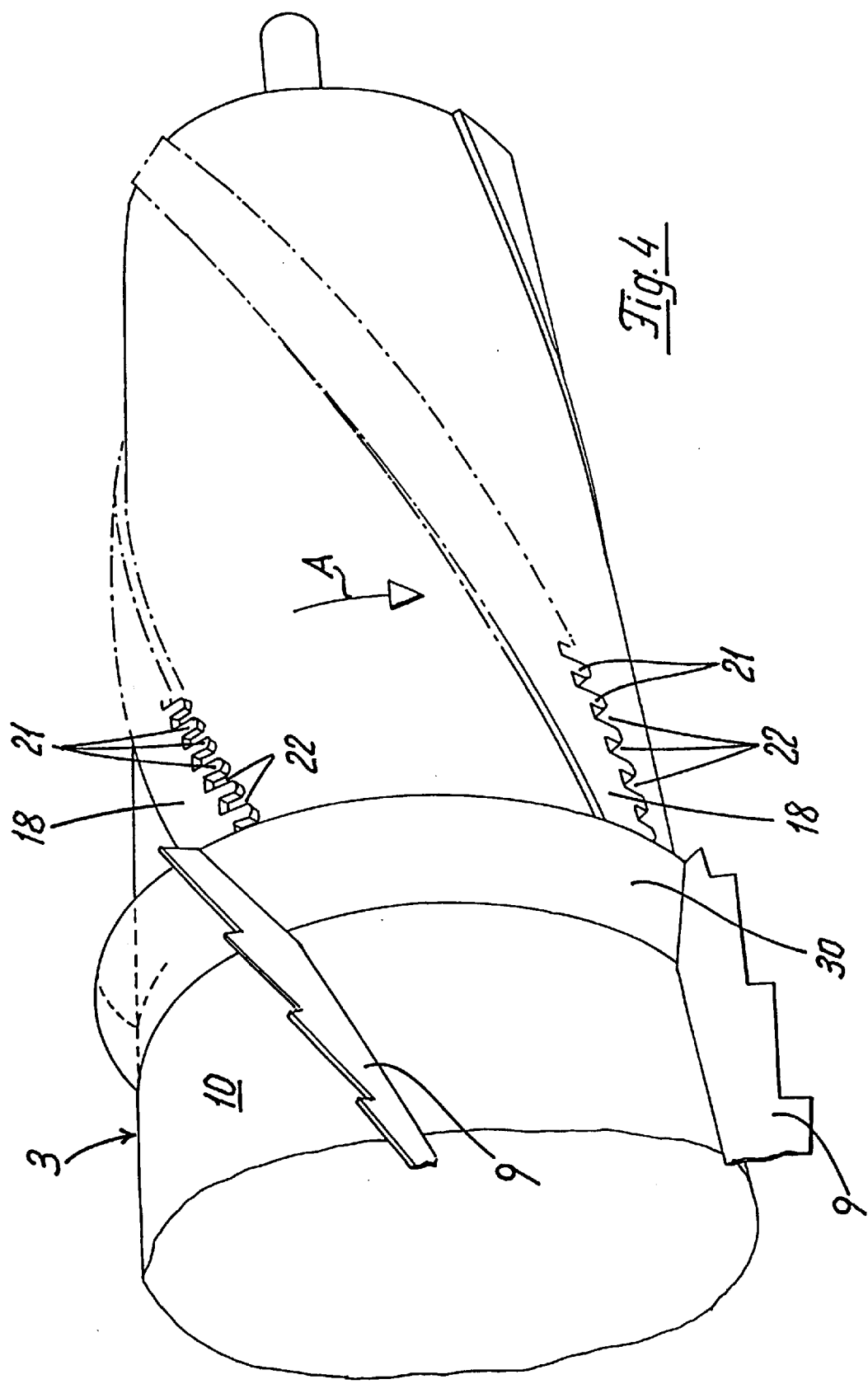
FIG. 4 is a perspective view of a separating rotor constructed in accordance with the invention.

The combine harvester shown in FIG. 1 is designed as a self-propelled combine harvester 1 equipped with a separating device which works by the axial-flow method and which contains at least one rotatable separating rotor 3 which is surrounded by a housing 4. This housing 4 consists of an upper portion in the form of a hood 5 and a lower portion in the form of a separating cage 6. In the embodiment shown in FIG. 1, the axis of rotation of the separating rotor 3 lies transversely to the wheel axles of the wheel pairs 7, 8 of the combine harvester 1. Consequently the direction of conveying of the separating rotor 3 is opposite the direction of forward travel of the combine harvester 1. Moreover, the separating rotor 3 is provided with four conveying strips 9 which form the conveying elements extending helically around the main body 10, as shown in FIG. 4. The combine harvester 1 is further equipped with a blower 11 located below the separating rotor 3 and a screen device 12 also located below the separating rotor 3. Moreover the combine harvester 1, in a manner known in the art, is equipped with a cutting table, not shown, and a sloping conveyor 14 which conveys the cut material to a thresher. All these elements are rather unimportant to the invention and can be altered as desired.

In the embodiment shown in FIG. 1, the thresher 13 consists of a threshing drum 15 and a transfer drum 16, which is mounted directly in front of the feed end of the separating rotor 3 and transversely to its axis of rotation.

Furthermore the combine harvester 1 is also equipped with a generally known distributor 17 for the chopped material. As FIG. 1 shows, the rear end region of the separating rotor 3 is equipped as a chopping device.

In the embodiments shown the main body 10 of the separating rotor 3, which is approximately annular in cross-section and rather smooth-surfaced on the outside, is equipped in the region of its rear end with four preferably helically, spirally or arcuately extending positioning strips 18 which are in each case parallel and offset from each other at an angle of 90°. The basic cross-sections of the positioning strips 18 are rectangular and relatively thin. The positioning strips 18 are rigidly connected to the main body 10 of the separating rotor 3 for example by welding or by bolting. A plurality of spaced-apart supporting rings 19 which, according to the embodiments shown, are equipped with four impact teeth 20 at distances of 90° from each other, are mounted on the main body 10 of the separating rotor 3. In an advantageous embodiment the supporting rings 19 are in one piece with the impact teeth. The supporting ring holes are provided at their circumference with recesses adapted to the positioning strips 18.

Figure 3:
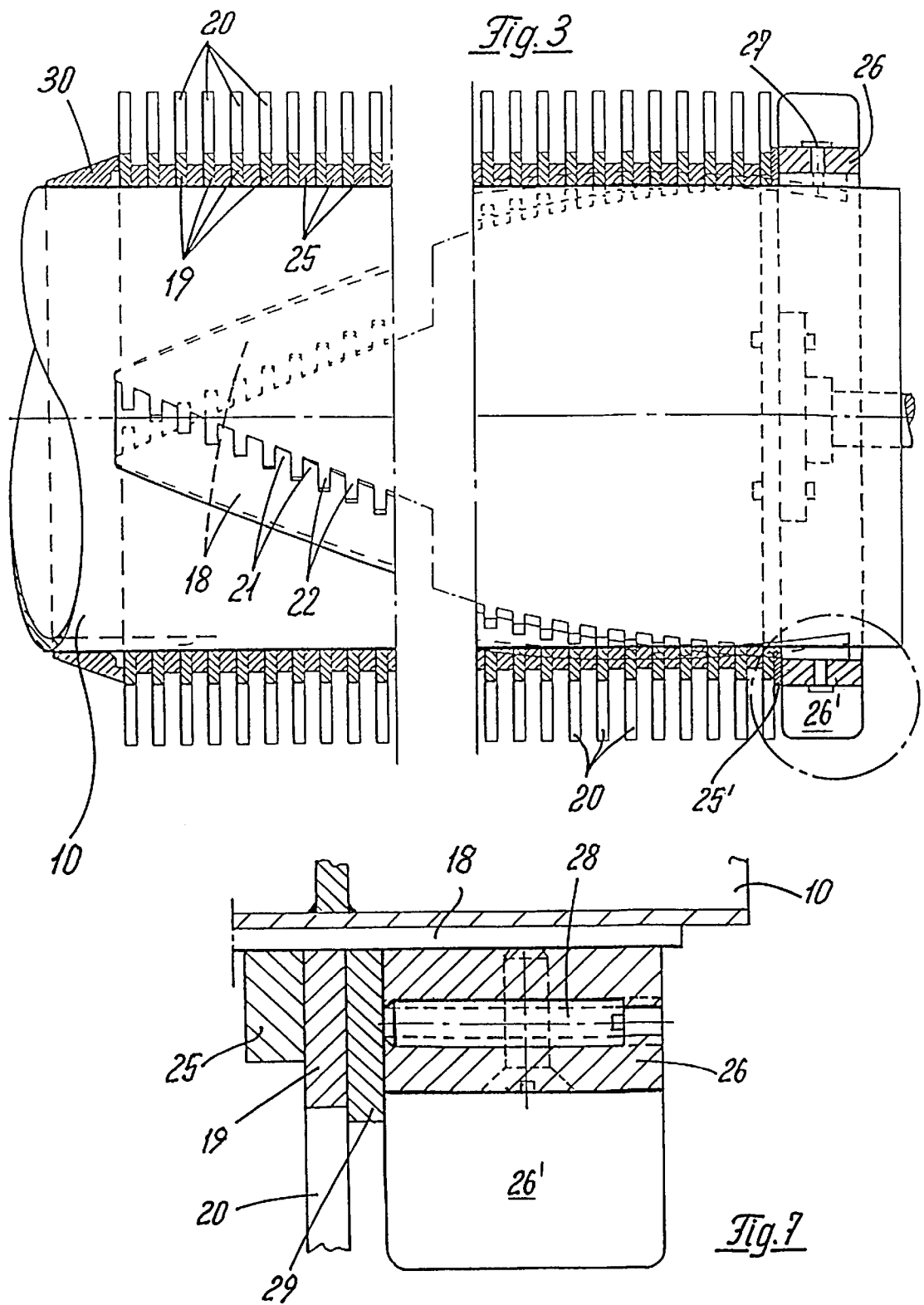
FIG. 3 is a cross-sectional view taken along line III—III in FIG. 2.
Figure 5:
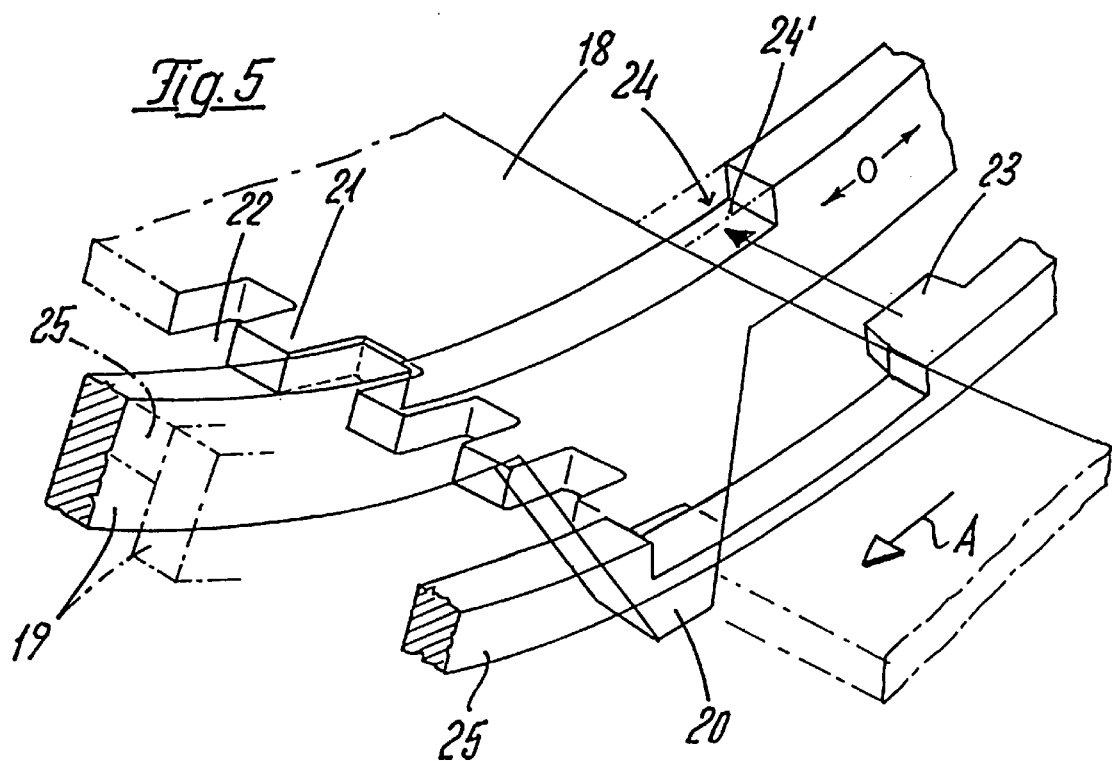
FIG. 5 is a fragmentary perspective view illustrating the form-locking connection of the supporting rings to the positioning strips in a first embodiment.

In the embodiment according to FIGS. 3 to 5, the positioning strips 18 on the front longitudinal side in the direction of rotation A of the separating rotor 3 are provided with teeth which are formed from rectangular teeth 21 and corresponding tooth gaps 22. As shown in particular by FIG. 5, after s fitting the supporting rings 19 on the main body 10 of the separating rotor 3, the supporting rings 19 are moved in a direction opposite the direction of rotation A of the separating rotor 3, so that the regions adjoining the recesses engage in the tooth gaps 22. As a result, form locking is achieved between the supporting rings 19 and the main body 10 of the separating rotor 3. This form locking is secured by clamping elements 23 in the form of wedges which engage in the partial recesses 24' formed by rotation of the supporting rings 19. The clamping elements 23 are attached to spacer or distance rings 25 which are located between the supporting rings 19.

Figure 6:
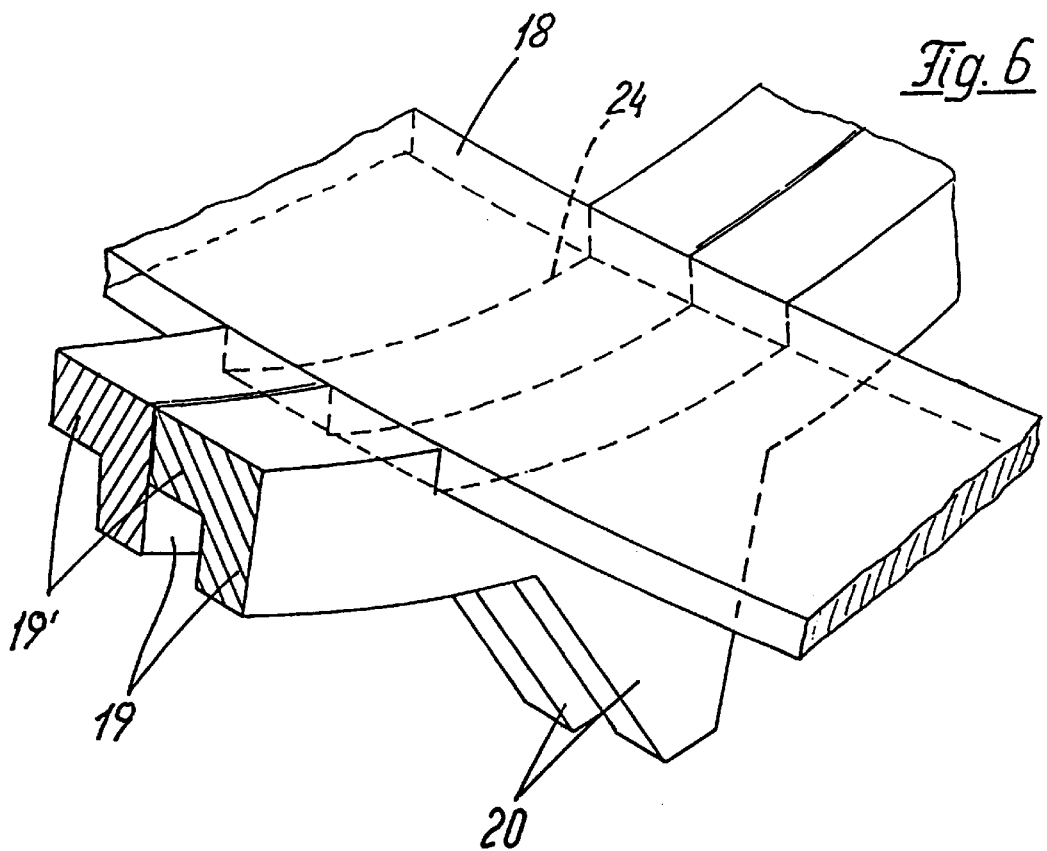
FIG. 6 is a fragmentary perspective view illustrating the form-locking connection of the supporting rings to the positioning strips in a second embodiment.

In the embodiment according to FIG. 6 the cross-section of each positioning strip 18 corresponds to that of a flat steel bar. The recesses 24 of the supporting rings 19 are selected such that they can be fitted on the positioning strips 18 in closing relationship. By contrast to the construction best shown in FIGS. 4 and 5, the supporting rings 19 are angle-shaped, so that the distance between the impact teeth 20 is predetermined by the attachment 19' of smaller diameter attached to the supporting ring 19. In both constructions a form-locking connection, which is free from connecting elements, is achieved between the supporting rings 19 and the main body 10 of the separating rotor 3. A locking ring 26 is releasably fitted on the rear end of the main body 10, in the direction of conveying the straw, which in its simplest construction is prevented from sliding by radially screwed-in locking screws 27. This ensures that the spacer or distance ring 25' mounted as a closure of the assembly group cannot come loose in the construction according to FIG. 3. In the construction according to FIG. 6 the supporting rings 19 are prevented only from turning by the positioning strips 18. Thus, it is provided that according to FIG. 7 the locking ring 26 is additionally provided with several pressure screws 28 working in an axial direction. As a result, the distance rings 25 or the supporting rings 19 are firmly pressed against one another. A pressure disc 29 is provided between the last supporting ring 19 and the locking ring 26 to distribute the compression forces applied by the pressure screws 28. The locking rings are provided at their outer circumference with impact plates 26', which are present at least according to the division of the impact teeth 20. The effect of these impact plates 26' is favorable for discharge of the chopped material.

Figure 2:
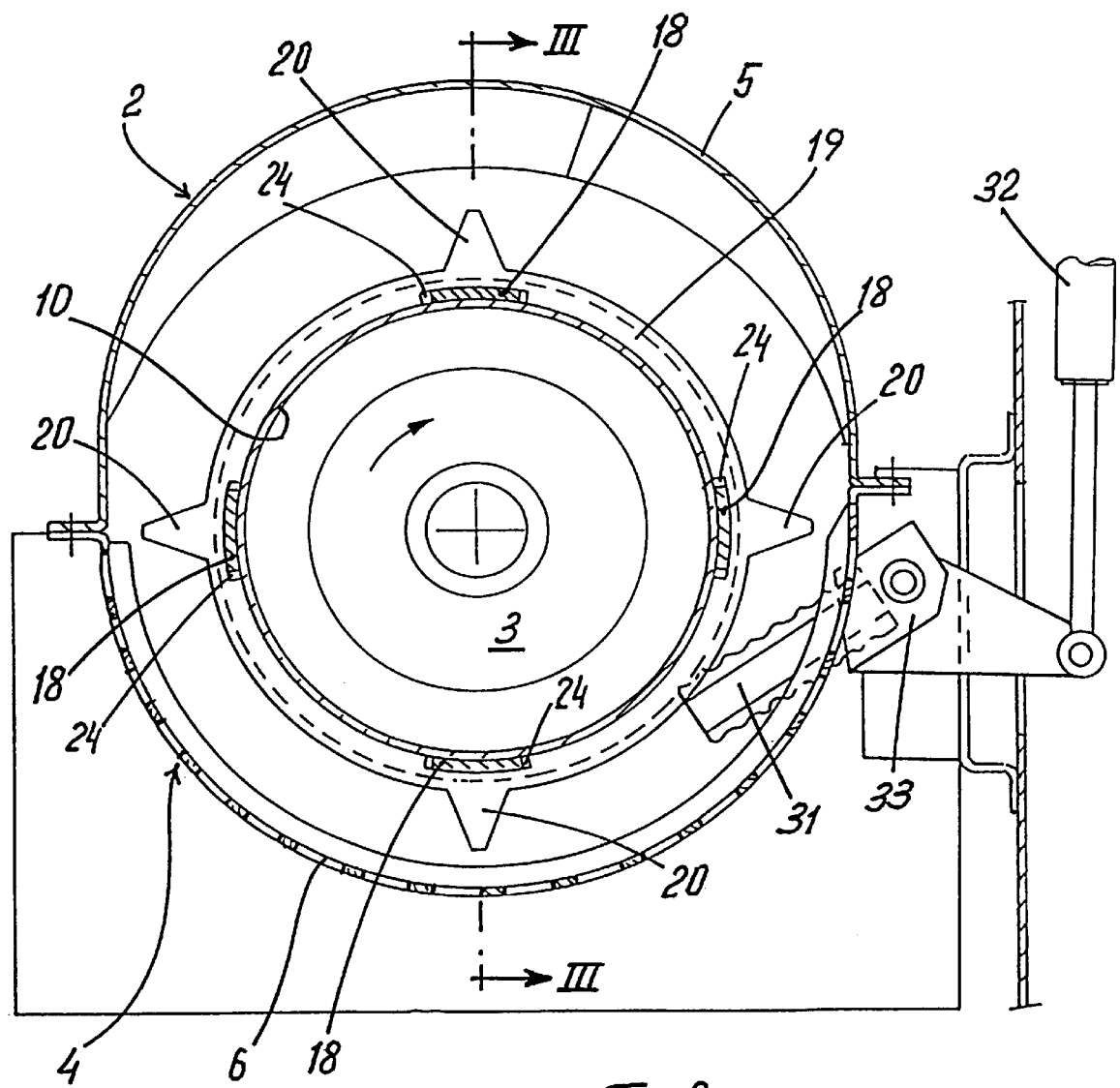
FIG. 2 is a cross-sectional view taken along line II—II in FIG. 1.

FIGS. 2 to 7 show that the connection of the supporting rings 19 to the main body 10 of the separating rotor 3 is also constructed as a push-fit system, so that mechanical connecting elements are eliminated here too. It can also be seen that assembly, dismantling or exchange of various supporting rings can take place within an extremely short time. FIGS. 3 and 4 also show that the main body 10 of the supporting rotor 3 is equipped with an input cone 30 on which is supported and centred the first supporting ring 19 in the direction of flow of material. Due to the input cone 30, a transition is made without attachments between the main body 10 of the separating rotor 3 and the higher working plane of the supporting rings 19. FIG. 2 also shows that the annular gap between the separating rotor 3 and the housing 4 in the region of the separating cage 6 is decreased in relation to the hood 5. However, a smooth transition can also be made, for example by a reduced diameter of the separating rotor 3 in this region.

The invention is not confined to the embodiments shown. An essential point is a form-locking connection of the supporting rings 19 carrying the impact teeth 20 to the main body 10 of the separating rotor 3 without mechanical connecting elements or weld seams being necessary for this. It is also important that no special tools are required for assembly of the supporting rings 19.

The distribution of the impact teeth 20 on the rotor main body is determined by the form of arrangement of the positioning strip or several positioning strips. Alternatively it is possible to provide the inner edge of each supporting ring hole with a plurality of latch-in recesses, thereby creating a choice of various possible arrangements of impact teeth on the rotor and allowing for one or more positioning strips to be arranged with axes parallel to the axis of rotation of the rotor.

As FIG. 2 shows, chopping blades 31 comprising cutting edges are arranged between the impact teeth 20. By means of an actuating mechanism 32 which can be operated from the driver's cab, the chopping blades 31 can be pivoted from the operating position shown in FIG. 2 and into a rest position. The chopping blades 31 are fixed to blade holders 33 and therefore can be used in such a way that one or the other cutting edge can be used selectively.

Other objects, features and advantages will be apparent to those skilled in the art. While preferred embodiments of the present invention have been illustrated and described, this has been by way of illustration and the invention should not be limited except as required by the scope of the appended claims.

I claim:

1. In a combine harvester having a cutting mechanism; an elevating conveyor for transporting the cut material; a threshing mechanism mounted behind the elevating conveyor; an axial-flow separating mechanism for separating grain from straw; and the separating mechanism being mounted behind the threshing mechanism and comprising at least one drivable separating rotor surrounded by a housing, a chopping device for the straw over a certain conveying distance and cooperating with chopping blades, and the separating rotor including a cylindrical main body carrying one or more rows of impact teeth extending in the longitudinal direction and which are arranged on spaced supporting rings; the improvement comprising:

the main body of each separating rotor having a plurality of positioning profiles fixed thereto, said positioning profiles having teeth at a longitudinal edge thereof, the supporting rings corresponding to the rotor circumference being provided with at least a number of recesses corresponding to the number of positioning profiles, and means for securing the supporting rings and the positioning profiles in form-locking relationship to prevent turning and axial sliding.

2. A combine harvester according to claim 1, wherein said rows of impact teeth extend in the longitudinal direction helically.

3. A combine harvester according to claim 1, wherein the regions of said supporting rings adjoining the recesses lie in the tooth gaps of the positioning profile teeth.

4. In a combine harvester having a cutting mechanism; an elevating conveyor for transporting the cut material; a threshing mechanism mounted behind the elevating conveyor; an axial-flow separating mechanism for separating grain from straw; and the separating mechanism being mounted behind the threshing mechanism and comprising at least one drivable separating rotor surrounded by a housing, a chopping device for the straw over a certain conveying distance and cooperating with chopping blades, and the separating rotor including a cylindrical main body carrying one or more rows of impact teeth extending in the longitudinal direction and which are arranged on spaced supporting rings; the improvement comprising:

the main body of each separating rotor having a plurality of positioning profiles fixed thereto, the supporting rings corresponding to the rotor circumference being provided with at least a number of recesses corresponding to the number of positioning profiles, means for securing the supporting rings and the positioning profiles in form-locking relationship to prevent turning and axial sliding, and a spacer ring between two of said supporting rings which on one side face comprises clamping elements which engage in form-locking relationship in the free partial recesses of said supporting rings resulting from the tooth gaps of the positioning profiles.

5. A combine harvester according to claim 4 wherein said clamping elements are wedge-shaped and formed integrally on the front side face of each spacer ring.

6. A combine harvester according to claim 4 wherein said positioning profile teeth comprise alternately arranged rectangular teeth and corresponding tooth gaps.

7. A combine harvester according to claim 4 wherein said teeth, seen in the direction of rotation of the separating rotor, are provided at the leading longitudinal edge of each positioning profile.

8. A combine harvester according to claim 4, wherein said positioning profiles in cross-section are flat profile sections, said supporting rings in cross-section are angle-shaped, said impact teeth are attached to the circumferential surface of larger diameter, and the widths of said recesses of the supporting rings essentially correspond to the width of said positioning profiles.

9. A combine harvester according to claim 4, wherein said positioning profiles are equiangularly spaced-apart.

10. A combine harvester according to claim 4, wherein a locking ring is releasably mounted on the rear end, relative to the direction of flow of chopped material, of said main body of the separating rotor.

11. A combine harvester according to claim 10 wherein several pressure screws working in the axial direction of the separating rotor are screwed into said locking ring.

12. A combine harvester according to claim 10, wherein a pressure disc is arranged between said locking ring and the facing supporting ring.

13. In a combine harvester having a cutting mechanism; an elevating conveyor for transporting the cut material; a threshing mechanism mounted behind the elevating conveyor; an axial-flow separating mechanism for separating grain from straw; and the separating mechanism being mounted behind the threshing mechanism and comprising at least one drivable separating rotor surrounded by a housing, a chopping device for the straw over a certain conveying distance and cooperating with chopping blades and the separating rotor including a cylindrical main body carrying one or more rows of impact teeth extending in the longitudinal direction and which are arranged on spaced supporting rings; the improvement comprising:

the main body of each separating rotor having a plurality of positioning profiles fixed thereto, the supporting rings corresponding to the rotor circumference being provided with at least a number of recesses corresponding to the number of positioning profiles, means for securing the supporting rings and the positioning profiles in form-locking relationship to prevent turning and axial sliding, and a locking ring releasably mounted on the rear end, relative to the direction of flow of chopped material, of said main body of the separating rotor wherein said locking ring is provided with at least one impeller paddle on its radial outer surface.

* * * * *